United States Patent
Beall et al.

(10) Patent No.: US 8,709,577 B2
(45) Date of Patent: *Apr. 29, 2014

(54) HIGH POROSITY CERAMIC HONEYCOMB ARTICLE CONTAINING RARE EARTH OXIDE AND METHOD OF MANUFACTURING SAME

(75) Inventors: Douglas Munroe Beall, Painted Post, NY (US); Yves Andre Henri Brocheton, Samoreau (FR); Gregory Albert Merkel, Corning, NY (US)

(73) Assignee: Corning Incorporated, Corning, NY (US)

( * ) Notice: Subject to any disclaimer, the term of this patent is extended or adjusted under 35 U.S.C. 154(b) by 1779 days.

This patent is subject to a terminal disclaimer.

(21) Appl. No.: 11/823,580

(22) Filed: Jun. 28, 2007

(65) Prior Publication Data
US 2012/0177875 A1    Jul. 12, 2012

(51) Int. Cl.
*C04B 35/195* (2006.01)
(52) U.S. Cl.
USPC ............. 428/116; 55/523; 422/180; 428/325
(58) Field of Classification Search
USPC ........... 428/116, 117, 118, 158; 55/522–524; 156/89.22; 502/439; 501/53, 69, 70
See application file for complete search history.

(56) References Cited

U.S. PATENT DOCUMENTS

| | | | |
|---|---|---|---|
| 4,194,917 A | 3/1980 | Sakemi et al. | 106/62 |
| 5,334,570 A * | 8/1994 | Beauseigneur et al. | 502/304 |
| 5,346,722 A | 9/1994 | Beauseigneur et al. | 427/300 |
| 6,004,501 A * | 12/1999 | Cornelius et al. | 264/631 |
| 6,265,334 B1 | 7/2001 | Sechi et al. | 501/9 |
| 6,300,263 B1 * | 10/2001 | Merkel | 501/9 |
| 6,391,813 B1 * | 5/2002 | Merkel | 501/119 |
| 6,764,742 B2 * | 7/2004 | Ichikawa et al. | 428/116 |
| RE39,120 E | 6/2006 | Sechi et al. | 501/9 |
| 7,122,612 B2 | 10/2006 | Tao et al. | 526/317.1 |
| 7,132,150 B2 | 11/2006 | Ogunwumi et al. | 428/117 |
| 7,704,296 B2 * | 4/2010 | Merkel | 55/523 |
| 2003/0143370 A1 * | 7/2003 | Noguchi et al. | 428/116 |
| 2005/0239640 A1 | 10/2005 | Nilsson et al. | 502/202 |
| 2006/0021308 A1 * | 2/2006 | Merkel | 55/523 |
| 2006/0281627 A1 * | 12/2006 | Ellison et al. | 501/134 |
| 2007/0119133 A1 * | 5/2007 | Beall et al. | 55/523 |

FOREIGN PATENT DOCUMENTS

| | | | |
|---|---|---|---|
| CN | 1 277 173 | 12/2000 | |
| JP | 57-038371 | 3/1982 | |
| JP | 2005-511294 | 4/2005 | ............ B01D 39/20 |
| WO | 00/40521 | 7/2000 | |
| WO | WO2005/056180 | 6/2005 | ............ B01J 13/02 |
| WO | 2007/064454 | 6/2007 | |
| WO | WO2007/064454 | 6/2007 | ............ C04B 38/00 |
| WO | WO2007/064497 | 6/2007 | ............ B01D 46/24 |

OTHER PUBLICATIONS

U.S. Appl. No. 11/432,038, Miao et al, filed May 10, 2006,

* cited by examiner

*Primary Examiner* — David Sample
*Assistant Examiner* — Nicholas W Jordan
(74) *Attorney, Agent, or Firm* — Charles A. Greene; Matthew J. Mason; Joseph M. Homa

(57) ABSTRACT

The present invention describes a high porosity (% P≥45%), refractory, ceramic article comprising a cordierite ceramic phase and at least about 0.1 wt. % of a rare earth oxide, such as yttrium oxide or lanthanum oxide. When compared to typical high-porosity cordierite articles, the articles of the present invention may exhibit relatively high strength, relatively low microcracking, relatively high strain tolerance (MOR/E), and/or relatively high thermal shock resistance (TSP).

35 Claims, 12 Drawing Sheets

HIGH POROSITY CERAMIC HONEYCOMB ARTICLE CONTAINING RARE EARTH OXIDE AND METHOD OF MANUFACTURING SAME

FIELD OF THE INVENTION

The invention relates generally to a porous ceramic honeycomb article, and more particularly to a cordierite ceramic honeycomb article, such as for use in a particulate filter or catalyst support, and methods for manufacturing such honeycomb articles.

BACKGROUND OF THE INVENTION

Porous ceramic articles are used in many of applications where chemical inertness, mechanical strength, and high temperature resistance are desirable. In some applications, such as high temperature honeycomb particulate filter and honeycomb catalytic support applications, higher porosities are required. Total porosities often over 35% percent may be required. Added porosity increases the surface area of the article thereby enhancing lightoff and its capacity for the support of catalysts. In filters, providing relatively higher porosity generally lowers backpressure through the wall, such as in diesel particulate filter applications. Unfortunately, relatively higher porosity also reduces the mechanical strength of the article. Higher porosity generally leads to less material supporting the article, thinner segments surrounding and between the pores, and greater stress concentrations around the included larger pores. Thus, there is a desire to produce ceramic articles with elevated levels of total porosity, but which include enhanced strength and thermal shock capability. These attribute are desirable both during manufacturing processing, but also for canning, and in use.

Such high porosity is often achieved by mixing a pore-forming agent with a ceramic powder, forming the mixture into a green body (such as by extrusion), drying the green body, and firing the green body into a porous ceramic article. Finally, as total porosity increases, the amount of material in the fired article decreases and, as a general rule, so does the article's mechanical strength.

Porous ceramic articles for use in high temperature applications often comprise cordierite ceramics. Cordierite is a refractory ceramic with reasonable mechanical strength and a low coefficient of thermal expansion (CTE), and is, therefore, resistant to thermal shock. In conventional cordierite honeycombs, microcracks have been included in the cordierite phase to further reduce the apparent CTE, as low CTE has been equated with good thermal shock resistance properties. The cordierite expands first into the microcracks, closing the microcracks, before increasing gross dimension of the honeycomb. While good for improving thermal shock resistance, microcracks may introduce other issues. For example, during manufacture or use, microcracks may be filled in by washcoats thereby undesirably increasing CTE and reducing thermal shock resistance (TSR). Accordingly, certain pre-coating processes may be employed to avoid such filling of microcracks, such as described in U.S. Pat. No. 5,346,722; U.S. Pat. No. 7,122,612; and U.S. Pat. No. 7,132,150.

Further, a trend towards filters and substrates with relatively higher porosities may result in lower strength, porous refractory ceramic articles. As such, achieving porous honeycomb articles combining high porosity, high strength, and high thermal shock resistance has proven difficult.

SUMMARY OF THE INVENTION

The present invention describes a relatively high porosity, refractory, ceramic honeycomb article that exhibits relatively high thermal shock resistance, and high strength. In accordance with embodiments, total porosity (% P) may comprise % P≥45%, % P≥50%, % P≥55%, % P≥60%, or even % P≥65%. Further, the honeycomb articles may further possess a low CTE, such as CTE≤15×10$^{-7}$/° C. (25-800° C.), or even CTE≤13×10$^{-7}$/° C. (25-800° C.), and in some embodiments CTE≤10×10$^{-7}$/° C. (25-800° C.) or even CTE≤8×10$^{-7}$/° C. (25-800° C.). The ceramic honeycomb article includes a cordierite phase and a rare earth oxide. The rare earth oxide may be present from at least about 0.1 wt. %, or even 0.1 wt. % to 5.0 wt. %. Rare earth oxides may include yttrium oxide ($Y_2O_3$) or lanthanum oxide ($La_2O_3$). When compared to standard highly microcracked cordierite honeycomb articles, the article of present invention may exhibit reduced microcracking, increased strength, higher strain tolerance (MOR/E), and/or improved thermal shock-resistance, as defined by a thermal shock parameter (TSP).

According to embodiments of the invention, a ceramic honeycomb article is provided which comprises a predominant cordierite phase and greater than 0.1 wt. % yttrium oxide. As compared to a similar ceramic honeycomb article consisting essentially of cordierite, the yttrium oxide-containing article may exhibit a substantially similar CTE, an increase in MOR of over 200%, and an increase in elastic modulus (E) of 20%. The predicted thermal shock parameter (TSP) may also be increased, as witnessed by TSP≥600° C., TSP≥700° C., and in some embodiments TSP≥800° C., TSP≥900° C., or even TSP≥1000° C.

According to further embodiments of the invention, a method of manufacturing a porous ceramic honeycomb article is provided, comprising the steps of mixing cordierite-forming inorganic materials, a rare earth oxide source, and a pore former with a liquid vehicle to form a plasticized batch, forming the plasticized batch into a green honeycomb article, and firing the green honeycomb article to form the porous ceramic honeycomb article including a cordierite-type phase comprising $Mg_2Al_4Si_5O_{18}$ and 0.1 wt. % to 5.0 wt. % of a rare earth oxide, and % P≥45%.

DETAILED DESCRIPTION OF THE EMBODIMENTS

Figure 1:
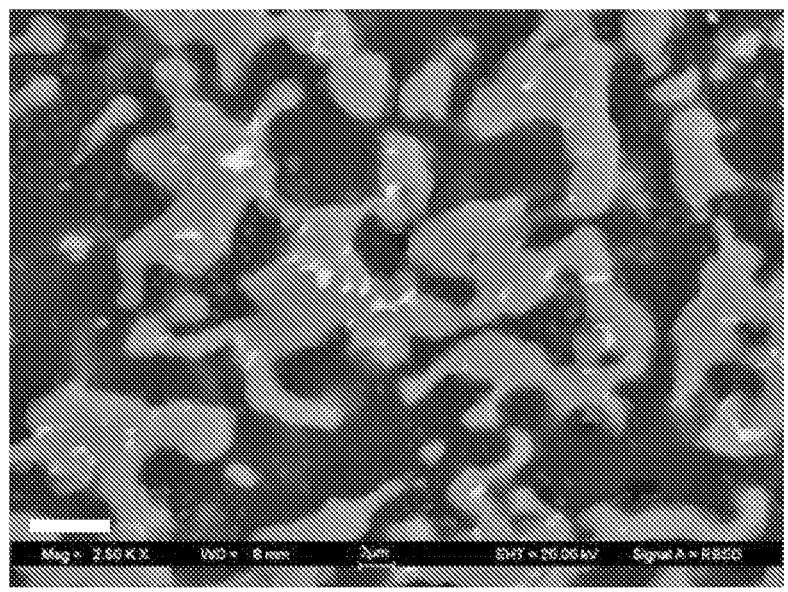
FIG. 1 is a scanning electron micrograph of a polished cross section of a wall of a representative inventive example showing the pore microstructure and the distribution of an intercrystalline, yttrium-containing alumino-silicate glass phase.
Figure 2:
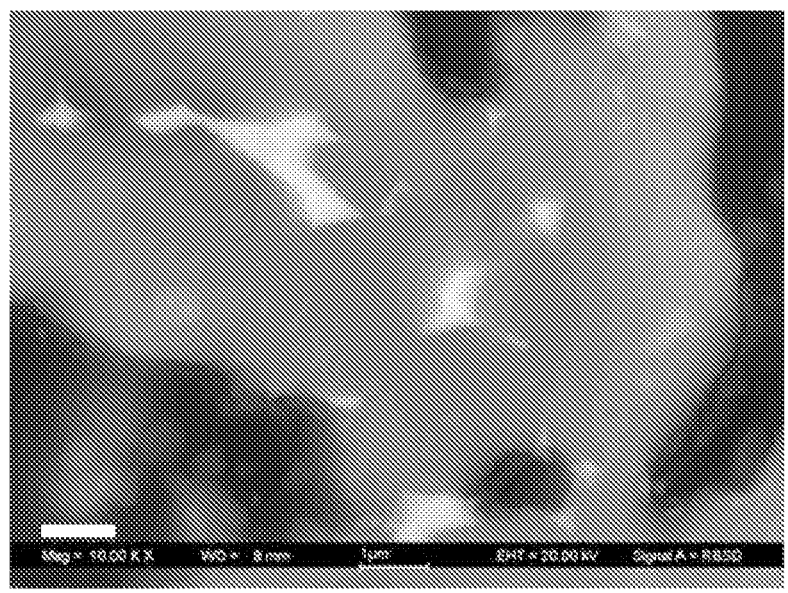
FIG. 2 is a scanning electron micrograph of a polished cross section of the wall of another inventive example at higher magnification showing the distribution and morphology of yttrium-containing alumino-silicate glass phase.

According to embodiments, the invention is a porous ceramic honeycomb article exhibiting a composition comprising a predominant phase of cordierite, and at least about 0.1 wt. % of a rare earth oxide within the microstructure of the honeycomb. By way of clarification, the rare earth is included within the wall of the honeycomb structure and is not within an after-applied washcoat. Preferably, the rare earth oxide comprises a chemical component of an intercrystalline glass phase within the ceramic microstructure, as depicted in FIGS. 1 and 2. FIGS. 1 and 2 are scanning electron micrographs of a polished cross sections of walls of a representative inventive example showing the pore microstructure and the distribution of an intercrystalline, yttrium-containing alumino-silicate glass phase. Scale bar in lower left is 5 microns on FIGS. 1 and 1 micron on FIG. 2.

Honeycomb articles including this composition exhibit improved mechanical properties over typical prior art cordierite compounds. Accordingly, they permit, for example, higher total porosities, lower cell densities, thinner cell walls, and/or lower thermal mass, or desirable combinations of these properties heretofore unachievable. Examples of the rare earth oxide include yttrium oxide and lanthanum oxide. These are included by way of additions into the cordierite forming batch and are described herein. Additionally, it has been discovered that the addition of the rare earth, such as yttrium or lanthanum, may improve the resistance to devitrification of the intercrystalline glass phase, and, therefore, enhance long-term survivability and maintenance of desired properties.

In porous honeycomb articles used as catalyst carrier substrates, the invention allows relatively higher porosity, and/or relatively thinner walls which may reduce back pressure levels, improve "light-off," and/or allow higher levels of catalyst to be employed on the honeycomb article. In porous honeycomb wall-flow filter applications, relatively higher porosity may be provided, thereby resulting in lower through-the-wall back pressure levels, and/or allowing higher levels of catalyst to be employed, and/or better thermal shock resistance as indicated by relatively higher thermal shock parameter (TSP). Further, the addition of rare earth oxide may advantageously decrease the relative level of microcracking which may increase mechanical strength and/or thermal shock resistance. In particular embodiments, combinations of relatively low levels of microcracking are provided, as well as relatively high Thermal Shock Parameter (TSP) values.

The porous ceramic honeycomb articles according to embodiments of the invention may further include total porosity, by volume, (% P) between 30% and 80%. In particular, total porosities (P %), by volume, wherein % P≥50%, % P≥55%, or even % P≥60% have been demonstrated by embodiments of the invention. The honeycomb articles may comprise a composition of magnesium alumino-silicate and predominately of a cordierite-type phase, and at least about 0.1 weight percent (on an oxide weight basis) of a rare earth oxide. Furthermore, weight percent (on an oxide weight basis) of a rare earth oxide may be between 0.1 wt. % and 5 wt. %.

The honeycomb may further include a cordierite-type phase, which exhibits the general composition $[A]_x[M]_y[T]_zO_{18}$, where A is selected from the group consisting of alkali, alkaline earth, rare earth elements, $CO_2$, and $H_2O$; M is selected from the group consisting of Mg, Fe, Mn, Co; T is selected from the group consisting of Al, Si, Ga, and Ge; $0≤x≤1.0$, $1.9≤y≤2.1$, and $8.9≤z≤9.1$. More preferably, $0≤x≤0.05$, $1.98≤y≤2.02$, and $8.98≤z≤9.02$, wherein M consists essentially of Mg, and T consists mainly of Al and Si. According to certain embodiments, the composition of the cordierite-type phase may be approximately $Mg_2Al_4Si_5O_{18}$. The cordierite-type phase, as described above, hereinafter referred to as cordierite, may have either orthorhombic or hexagonal crystal lattice symmetry, or may be comprised of a mixture of both such crystal structures. The cordierite phase preferably comprises at least 80% of the ceramic, and more preferably at least 85%, 90%, and even 95% of the ceramic.

The rare earth oxide comprises one or more oxides of one or more rare earth metals. An increase in mechanical strength is apparent at about 0.1 wt. % rare earth oxide addition. A commercially practicable upper limit for rare earth oxide is about 5 wt. %; although, an actual upper limit is likely higher. The rare earth oxide addition preferably comprises yttrium oxide or lanthanum oxide. In embodiments, the article may include 0.2 wt. % to 3.0 wt. % yttrium oxide, or even 0.4 wt. % to 2.0 wt. % yttrium oxide.

Figure 3:
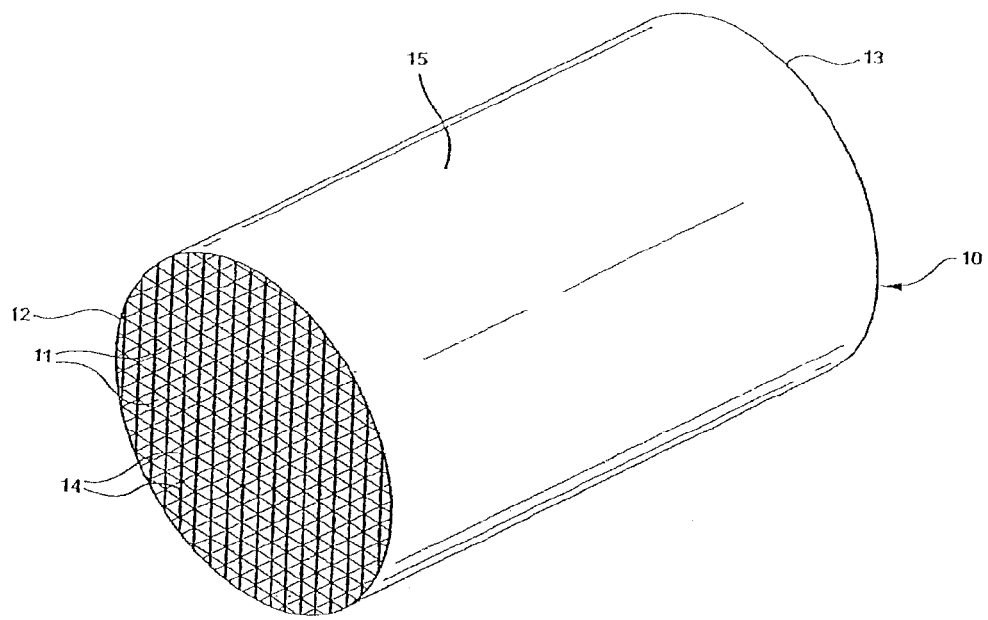
FIG. 3 is isometric view of honeycomb substrate according to embodiments of the invention.

The ceramic honeycomb article may have a honeycomb structure that may be suitable for use as, for example, a flow-through catalyst substrate, a heat regenerator core, or a wall-flow particulate filter, such as diesel exhaust particulate filter. A typical porous ceramic honeycomb flow-through substrate article 10 according to embodiments of the invention is shown in FIG. 3 and includes a plurality of generally parallel cell channels 11 formed by and at least partially defined by intersecting cell walls 14 (otherwise referred to as "webs") that extend from a first end 12 to a second end 13. The channels 11 are unplugged and flow through them is straight down the channel from first end 12 to second end 13. Preferably, the honeycomb article 10 also includes an extruded smooth skin 15 formed about the honeycomb structure, although this is optional and may be formed in later processing as an after applied skin. By way of explanation and not by limitation, the wall thickness of each cell wall 14 for the substrate may be between about 0.002 to 0.010 inches (about 51 to 253 µm), for example. The cell density may be between 300 and 900 cells per square inch (cpsi), for example. In a preferred implementation, the cellular honeycomb structure consists of multiplicity of parallel cell channels 11 of generally square cross section formed into a honeycomb structure. Alternatively, other cross-sectional configurations may be used in the honeycomb structure as well, including rectangular, round, oblong, triangular, octagonal, hexagonal, or combinations thereof. The term "honeycomb" as used herein is defined as a connected structure of longitudinally-extending cells formed of cell walls, having a generally repeating pattern therein.

Figure 4:
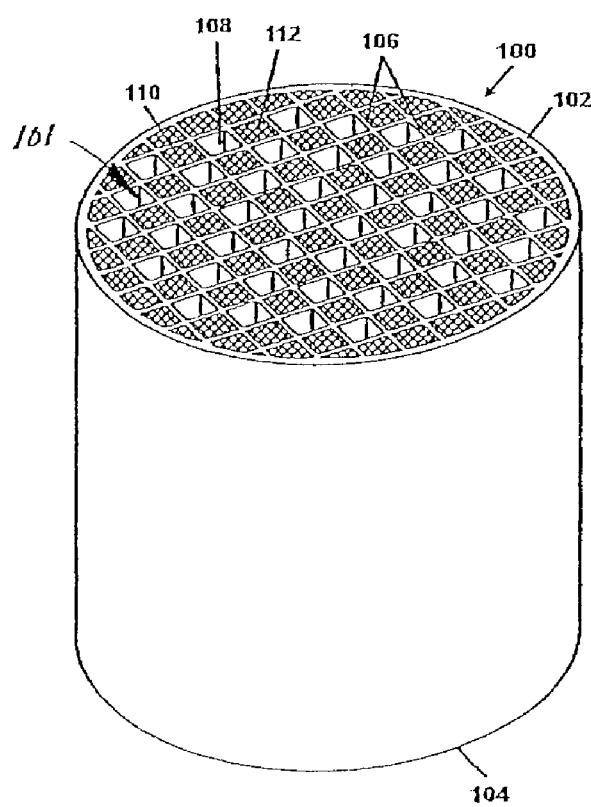
FIG. 4 is isometric view of honeycomb filter according to embodiments of the invention.

FIG. 4 illustrates a honeycomb filter 100 in accordance with another aspect of the invention. The general structure is the same as the flow-through substrate, including a body 101 made of intersecting porous ceramic walls 106 extending from the first end 102 to the second end 104. Certain cells are designated as inlet cells 108 and certain other cells are designated as outlet cells 110. In the filter 100, certain selected channels include plugs 112. Generally, the plugs are arranged at the ends of the channels and in some defined pattern, such as the checkerboard patterns shown. The inlet channels 108 may be plugged at the outlet end 104 and the outlet channels 110 may be plugged at the inlet end 102. Other plugging patterns may be employed and all of the outermost peripheral cells may be plugged (as shown) for additional strength. Alternately, some of the cells may be plugged other than at the ends. In another alternate embodiment, some channels may be flow-through channels and some may be plugged providing a so-called partial filtration design. The present invention is generally suitable for all filter designs. By way of explanation and not by limitation, the wall thickness of each cell wall 14 for the filter may be between about 0.010 to 0.030 inches (about 253 to 759 μm), for example. The cell density may be between 100 and 400 cells per square inch (cpsi), for example.

Typically, the porosity of such ceramic honeycomb filter articles and ceramic honeycomb flow-through substrate articles will be from 30-80%, and exhibit a median pore size of between 1-40 μm. The actual porosity and median pore size will depend on the desired application. A ceramic honeycomb article for use as a flow-through catalytic converter substrate (FIG. 3) may have, for example, a total porosity (% P) wherein 35%≤% P≤75%; 45%≤% P≤70%; or even 50%≤% P≤65%. In such flow-through honeycomb substrates according to embodiments of the invention, the median pore diameter (MPD) may be 1 μm≤MPD≤10 μm; 2 μm≤MPD≤8 μm; or even 3 μm≤MPD≤6 μm.

A porous ceramic honeycomb article for use as a wall-flow particulate filter (FIG. 4) may have a total porosity (% P) wherein % P≥45%; 50%≤% P≤80%; 55%≤5% P≤75%; or even 60%≤% P≤70%. Median pore diameter (MPD) for such filters may be between 6 μm≤MPD≤40 μm, 10 μm≤MPD≤30 μm, or even 15 μm≤MPD≤25 μm.

The method for manufacturing the ceramic honeycomb article of the invention comprises forming a batch mixture of a cordierite-forming raw material and a source of rare earth oxide. Optionally, the mixture may include a pore-forming agent, organic binders (such as methylcellulose), surfactants, lubricants, plasticizers, and solvents such as water or alcohol. The mixture is formed into a honeycomb shape such as by extrusion, compression molding, slip casting, or injection molding. The green honeycomb is then preferably dried by conventional RF or microwave drying to form a dried green body. The green body is then fired to a temperature and for a time sufficient to remove the pore former and provide a sintered, porous, cordierite ceramic article. Suitable firing conditions are listed in the tables herein and as described below.

The cordierite-forming raw material may include any compound or compounds that forth a predominant cordierite crystal phase upon firing. The cordierite-providing raw material may include a pre-reacted cordierite particulate, a magnesium alumino-silicate based glass frit, or a mixture of raw inorganic batch materials capable of forming cordierite at high temperatures. A suitable raw inorganic batch material mixture includes, for example, a magnesia source, an alumina source, and a silica source, such as selected from the group comprising, but not restricted to, talc or calcined talc, magnesium oxide, magnesium hydroxide, chlorite, enstatite, forsterite; crystalline or amorphous silica including quartz, zeolite, fused silica, colloidal silica, and silicon organo-metallic compounds; kaolin, calcined kaolin, and pyrophyllite; corundum, transition aluminas such as gamma, rho, theta, and chi alumina, aluminum hydroxide, diaspore, and boehmite.

The rare earth oxide source will include a compound or compounds that produce a rare earth oxide in the process of firing the ceramic article. The rare earth oxide source may be added to the batch as a small particle size powder, preferably with a median particle diameter of less than 5.0 μm, or even less than 1.0 μm. The rare earth oxide source may simply be one or more rare earth oxides, such as preferably yttrium oxide or lanthanum oxide. The rare earth oxide preferably reacts with one or more of the cordierite-forming components to form a rare earth-containing intercrystalline glass phase in the fired body.

Pore formers may include carbon-containing compounds, such as graphite, starch, and various organic polymers and resins that will volatilize during firing of the honeycomb green body, or combinations thereof. The amount of pore former depends on the desired final total porosity of the finished ceramic honeycomb article. For example, a ceramic honeycomb article with approximately 30% porosity will typically require no additional pore forming agent, where a ceramic honeycomb with 45-55% porosity may be produced from a green honeycomb body comprising 100 parts by weight of a ceramic powder, about 30 parts by weight of an organic pore former such as graphite, and a sufficient amount of water. During firing, the organic pore former volatilizes and contributes to internal interconnected porosity, that is, pores, in the ceramic honeycomb article.

In some embodiments, the raw material mixture may further include a colloidal metal oxide source. The colloidal metal oxide source is capable of forming a colloidal suspension in a solvent preferably and contains 0 to 97 wt % $SiO_2$, 0 to 97% MgO, 0 to 97% $Al_2O_3$, and at least 3.0 wt. % of one or more metal oxides selected from the group comprising $Li_2O$, $Na_2O$, $K_2O$, CaO, $Fe_2O_3$, and $TiO_2$. The metal oxides may further comprise at least 4%, at least 5%, or even at least 6 wt. % of the colloidal metal oxide source. According to embodiments, the colloidal metal oxide source may comprise a colloidal silicate phase containing at least 50 wt % $SiO_2$ when the chemical formula is calculated on an anhydrous basis. For example, the colloidal silicate may be a colloidal phyllosilicate, such as an attapulgite, smectite, or bentonite clay.

Firing generally occurs at kiln temperatures from 950° C.-1440° C. The firing temperature depends on the relative composition and raw materials used to make the article. For example, when the cordierite-providing raw material is a pre-reacted cordierite, the firing temperature is preferably from 1200° C.-1400° C. A magnesium alumino-silicate based glass frit will be fired in the range of 950° C. to 1200° C., and a mixture of cordierite-forming raw materials can be fired at 1350° C. to 1440° C. for 4 to 40 hours, for example. Exemplary firing cycles for cordierite examples manufactured from mixtures of powdered cordierite-forming inorganic batch materials are provided in the Tables below.

The present invention is illustrated by the examples in Tables below and by reference to FIGS. 1-5 and 7-12. The examples were prepared by blending the raw batch materials in the amounts described. The resulting mixtures were blended with sufficient amounts of methylcellulose binder; one or more of sodium stearate, stearic acid, oleic acid, or polyalphaolefins as lubricants; and distilled water until the mixtures were of suitable plasticity. The wet batches were then extruded to form honeycombs with the cell density (cells per square inch) and wall thickness (mils) described. The honeycomb was dried and fired to form the porous ceramic honeycomb articles.

In the Tables, various properties of the exemplary honeycombs are provided. Provided are the total porosity (% P) which is the volume percentage of porosity in the walls of the honeycomb article as measured by mercury porosimetry, and $d_{10}$; $d_{50}$, and $d_{90}$. The terms $d_{10}$, $d_{50}$, and $d_{90}$ denote the pore diameters (μm) at which 10%, 50%, and 90% of the total pore volume are of a finer pore diameter, respectively, as determined by mercury porosimetry. Also provided are the so-called d-factor ($d_f$), defined as $d_f=(d_{50}-d_{10})/d_{50}$, which is a measure of the narrowness of the fine pore fraction (that below $d_{50}$) of the pore size distribution of the total porosity, and the so-called breadth factor ($d_b$), which is a measure of the overall narrowness of the pore size distribution of the total porosity, and which is defined as $d_b=(d_{90}-d_{10})/d_{50}$.

CTE is the mean coefficient of thermal expansion from 25° C. to 800° C. in units of $10^{-7}/°C.$ as measured by dilatometry on a specimen parallel to the lengths of the channels of the article (in the "axial direction"). Mean CTE values for 500 to 900° C. and from 200 to 1000° C. are also provided for some examples.

The amounts of the secondary crystalline phases, mullite, spinel+sapphirine, and corundum (α-alumina), in the fired samples were measured by powder x-ray diffractometry.

The degree of cordierite crystal textural orientation within the ceramic body was characterized by measurement of the axial I-ratio $I_A=I(110)/[I(110)+I(002)]$ as determined by x-ray diffractometry in accordance with known practice on a cross section orthogonal to the lengths of the channels of the honeycomb. Another measure of cordierite crystal orientation in the honeycomb body is the transverse I-ratio, $I_T$, which is the peak intensity ratio $I_T=I(110)/[I(100)+I(002)]$ as determined by x-ray diffractometry on the as-fired surfaces of the walls of the honeycomb channels.

All modulus of rupture (MOR), or flexural strength, values were measured at room temperature by the four-point method on a sample cellular bar (1 inch×½ inch×5 inch long) parallel to the axial direction of the honeycomb article. Elastic modulus values were measured from room temperature (@ 25° C.) to 1200° C. and back to room temperature at approximately 50° C. intervals, using a sonic resonance technique, also on a cellular bar (1 inch×½ inch×5 inch long) and parallel to the axial direction in accordance with ASTM C 1198-01 or as described in co-pending U.S. patent application Ser. No. 11/823,138 filed Jun. 27, 2006 and entitled "Methods and Apparatus For Measuring Elastic Modulus Of Non-Solid Ceramic Materials By Resonance," the disclosure of which is hereby incorporated by reference herein.

Figure 5:
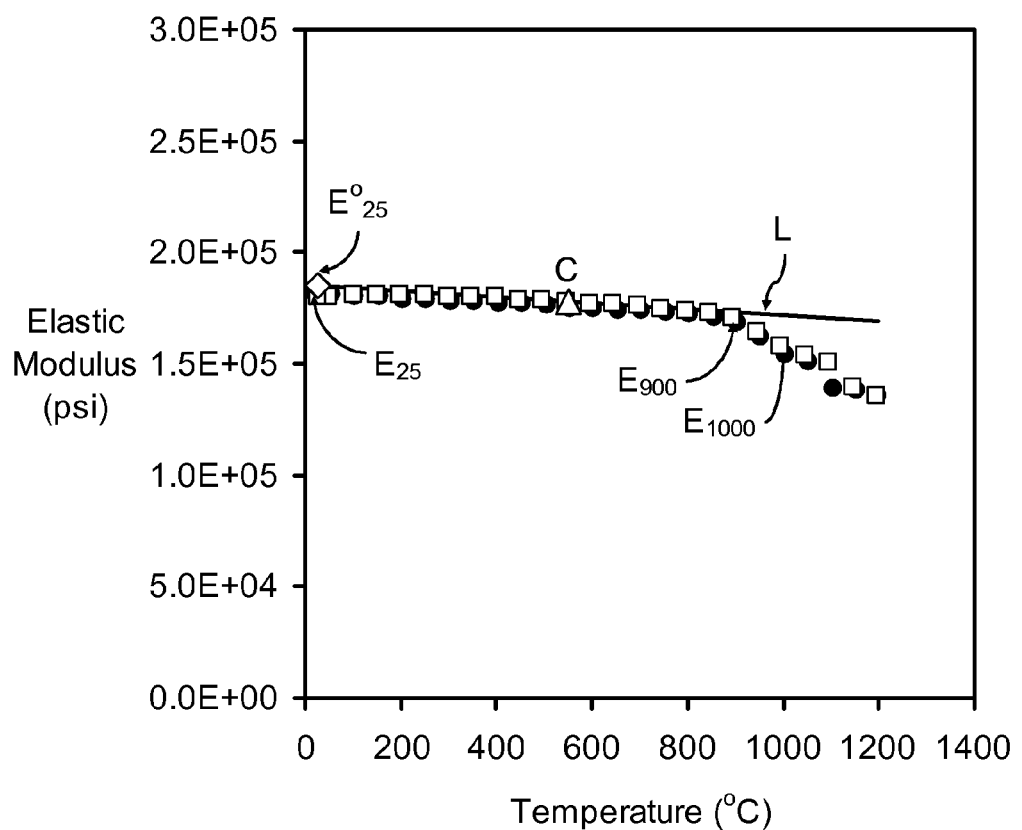
FIG. 5 is a plot of the elastic modulus versus temperature during heating and cooling of inventive example. Filled circles denote heating data, open squares denote cooling data, tangent to the cooling data at point C (open triangle) indicated by solid line (L), and open diamond is the value of the tangent at room temperature, E°$_{25}$. Also noted are the values of E$_{25}$, E$_{900}$, and E$_{1000}$ (elastic modulus at 25, 900, and 1000° C.) during heating.

According to another broad aspect of the invention, the ceramic honeycomb articles may be characterized as exhibiting a relatively low degree of microcracking. The relative degree of microcracking may be characterized by reference to the value of $E_{Ratio\ 1000}$, defined as $E_{Ratio\ 1000}=E_{1000°\ C.}/E_{RT}$ wherein $E_{1000}$ is the elastic modulus at 1000° C. and $E_{RT}$ is the elastic modulus at room temperature (@ 25° C.). The increase in elastic modulus with heating is believed to be caused by re-closing of the microcracks. Therefore, a higher ratio of $E_{1000°\ C.}/E_{RT}$ corresponds to a greater degree of microcracking. Relatively low levels of microcracking are provided in porous ceramic honeycomb articles according to embodiments of the invention. Accordingly, embodiments of the invention may exhibit an $E_{Ratio\ 1000}\le1.05$, or even $E_{Ratio\ 1000}\le1.00$. An example of the elastic modulus heating and cooling curve for an essentially non-microcracked inventive example is depicted in FIG. 5.

Another indication of the degree of microcracking of a ceramic body is the quantity $Nb^3$, herein referred to as the "Microcrack Parameter," where N is the number of microcracks per unit volume of ceramic and b is the diameter of the microcracks, based upon a simplified model (see D. P. H. Hasselman and J. P. Singh, "Analysis of the Thermal Stress Resistance of Microcracked Brittle Ceramics," Am. Ceram. Soc. Bull., 58 (9) 856-60 (1979).) The value of $Nb^3$ may be derived from the high-temperature elastic modulus measurement, from room temperature to 1200° C. and back to room temperature, by the following equation:

$$Nb^3=(9/16)[(E°_{RT}/E_{RT})-1]$$

where $E_{RT}$ is the elastic modulus measured at room temperature before heating the specimen, and $E°_{RT}$ is the room-temperature value of the elastic modulus of the same sample in a hypothetically non-microcracked state. The value of $E°_{RT}$ is determined by heating the specimen to 1200° C. in order to close and anneal the microcracks; cooling the sample back to room temperature; constructing a tangent to the near-liner portion of the E versus T curve during cooling, typically between about 600 and 900° C., where the specimen is still predominantly in a non-microcracked state; and extrapolating the tangent line back to room temperature. The value of $E°_{RT}$ is taken as the value of the tangent line evaluated at 25° C. The slope of the tangent line, $\Delta E/\Delta T$, and the value of $E°_{RT}$ should also satisfy the relation $$\Delta E/\Delta T=-7.5\times10^{-5}(E°_{RT})$$

Figure 6:
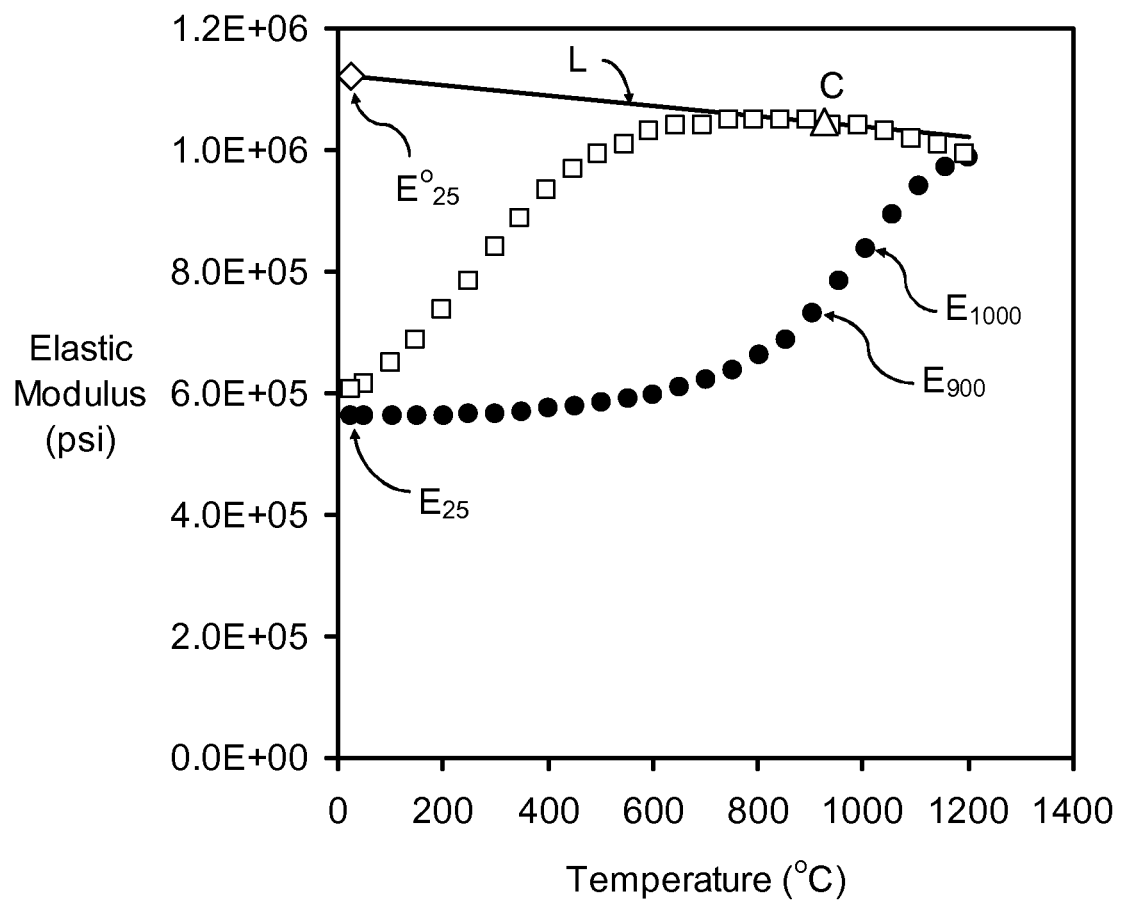
FIG. 6 is a plot of the elastic modulus versus temperature during heating and cooling of comparative example C1. Filled circles denote heating data, open squares denote cooling data, tangent to the cooling data at point C (open triangle) indicated by solid line (L), and open diamond is the value of the tangent at room temperature, $E°_{25}$. Also noted are the values of $E_{25}$, $E_{900}$, and $E_{1000}$ (elastic modulus at 25, 900, and 1000° C.) during heating.
Figure 7:
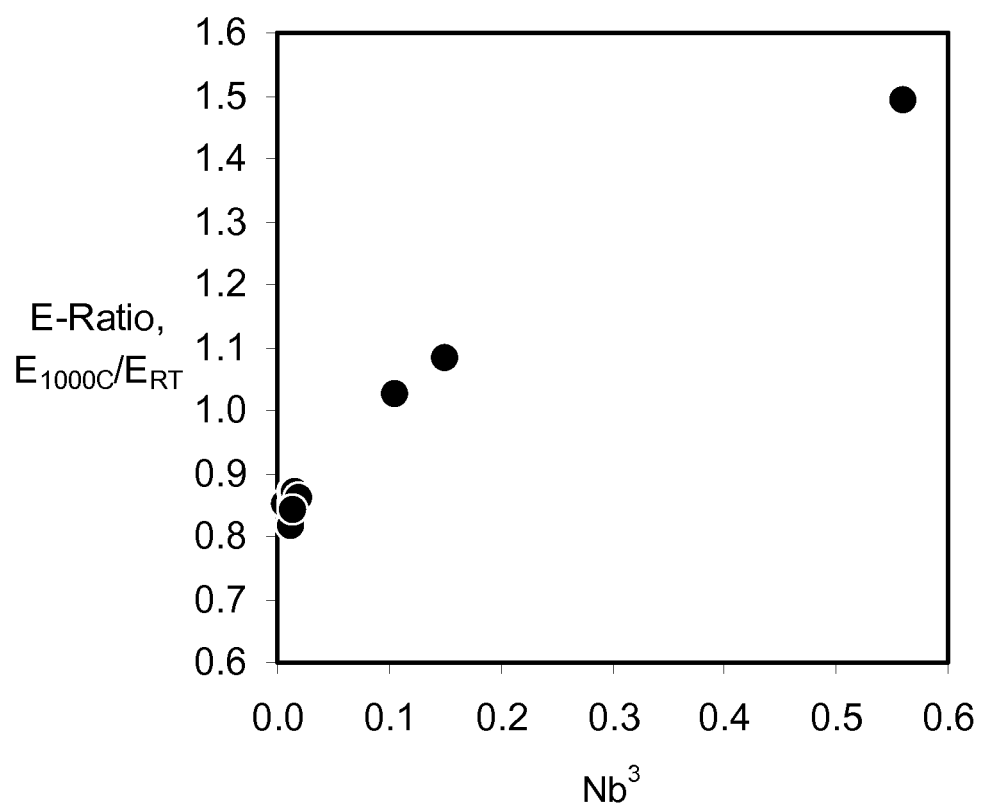
FIG. 7 is a plot of $E_{Ratio}=E_{1000° C.}/E_{RT}$ versus the microcrack parameter, $Nb^3$, for some of the inventive and comparative examples.

For a non-microcracked body, the value of $Nb^3$ is 0.00. In the inventive example depicted in FIG. 5, the value of $Nb^3$ is 0.014. In the comparative example in FIG. 6, the value of $Nb^3$ is 0.56. It has been experimentally determined that the ratio $E_{1000°\ C.}/E_{RT}$ is directly proportional to $Nb^3$, and that a value of $E_{1000°\ C.}/E_{RT}\le1.01$ approximately corresponds to a value of $Nb^3\le0.08$. A value of $E_{1000°\ C.}/E_{RT}$ of 1.05 equates to a value of the value of $Nb^3$ of about 0.10. The correlation relationship between $E_{1000°\ C.}/E_{RT}$ and $Nb^3$ is shown in FIG. 7.

Additionally, the level of microcracking may be determined by the thermal expansion differential factor $\Delta\alpha_{mc}$ defined as $$\Delta\alpha_{mc}=[76.8(I_A)^3-129.5(I_A)^2+97.9(I_A)-12.8]+0.6(\%\ Mu+Sp+Sa+Al)-CTE,$$

wherein %(Mu+Sp+Sa+Al) is the sum of the weight percentages of mullite, spinel, sapphirine, and corundum present in the honeycombs, and wherein $I_A$ is the axial I-ratio. The value of $\Delta\alpha_{mc}$ is a measure of the extent to which the CTE of the ceramic body is lowered due to microcracking relative to the value of CTE that the body would otherwise exhibit in an non-microcracked state for a given $I_A$ and % secondary crystalline phases. Values of $\Delta\alpha_{mc}$ less than about 4.5 exhibit low levels of microcracking. Embodiments having $\Delta\alpha_{mc}$ less than about 2.0 are also described, and exhibit even lower levels of microcracking.

Figure 8:
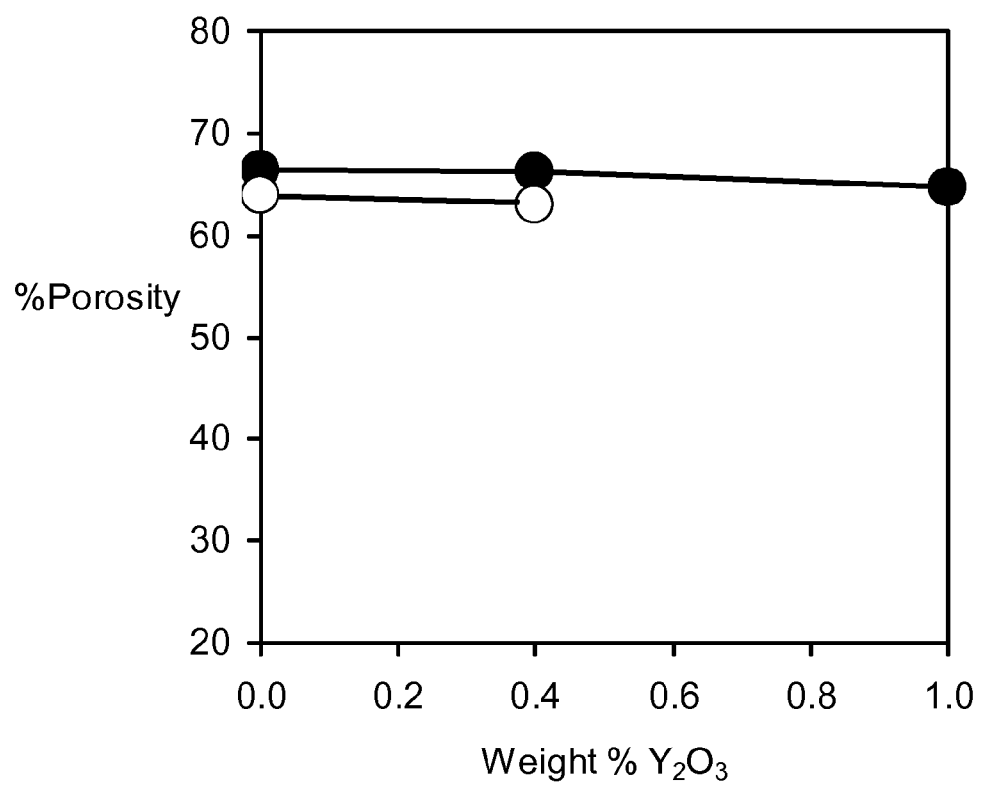
FIG. 8 is a graph of total porosity versus weight percent yttrium oxide for kaolin-based compositions.
Figure 9:
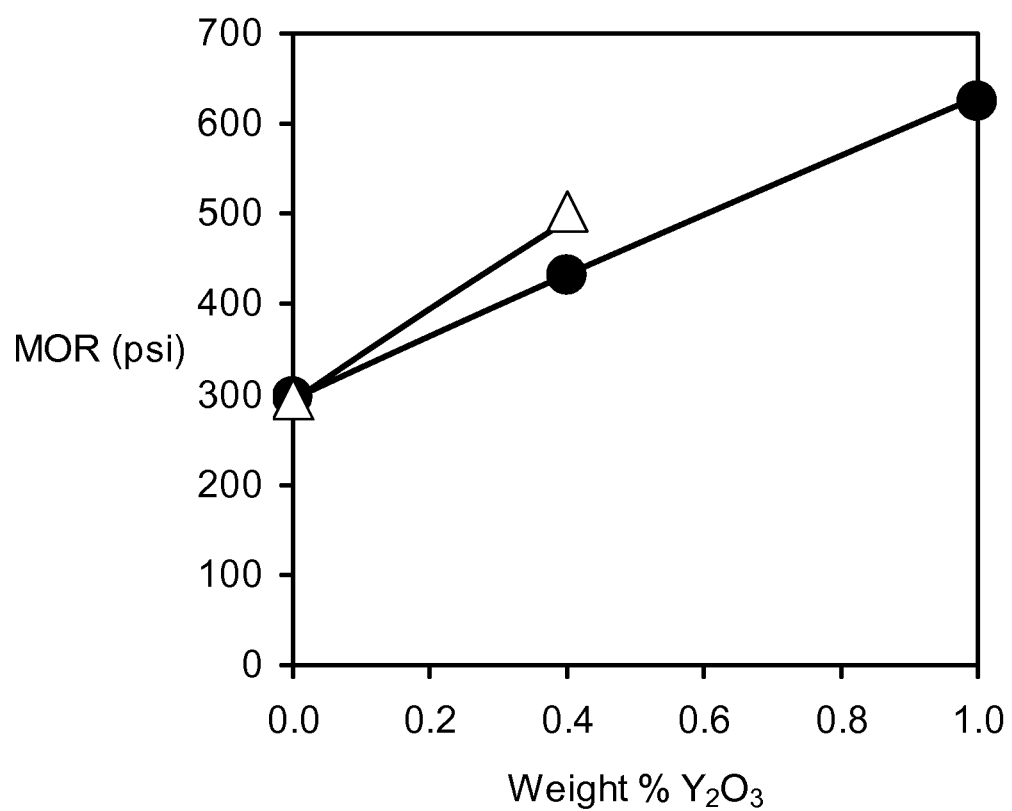
FIG. 9 is a graph of MOR versus weight percent yttrium oxide for kaolin-based compositions.
Figure 10:
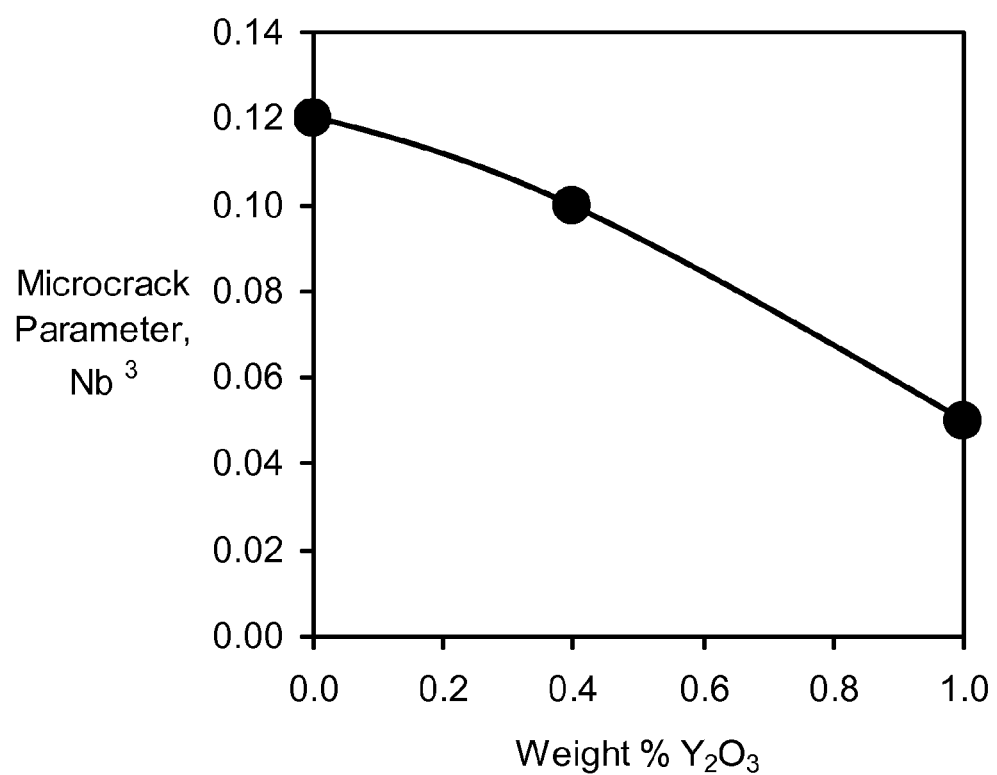
FIG. 10 is a graph of the microcrack parameter, $Nb^3$, versus weight percent yttrium oxide for kaolin-based compositions.
Figure 11:
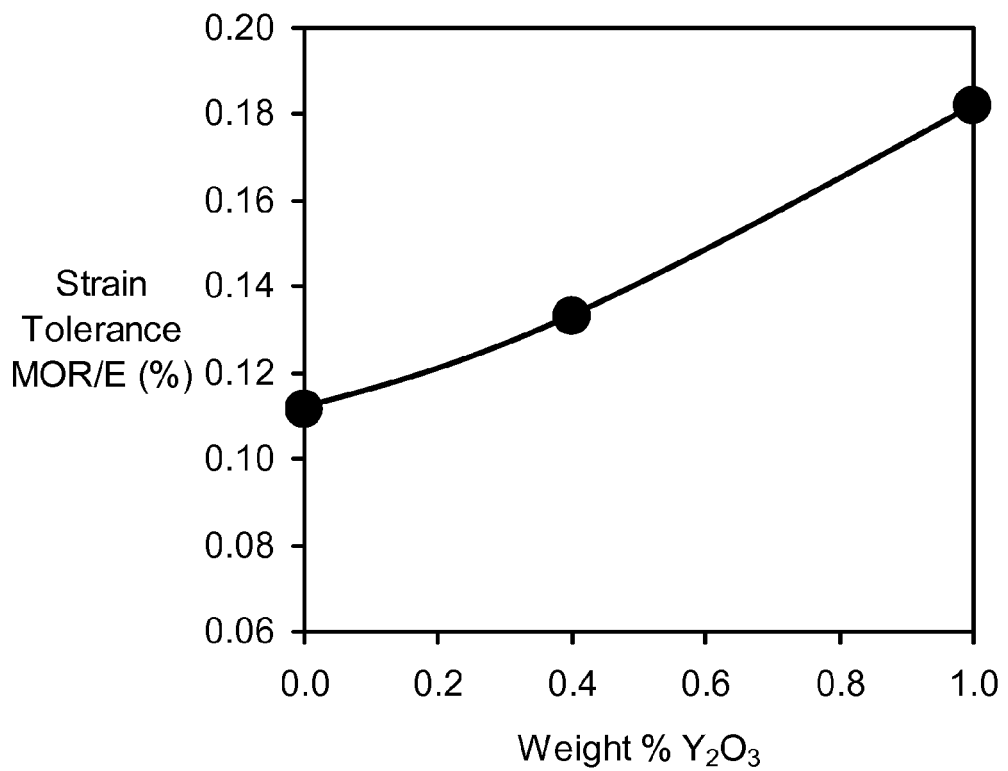
FIG. 11 is a graph of strain tolerance (defined as MOR/E) versus weight percent yttrium oxide for kaolin-based compositions.

The Tables and FIG. 8 demonstrate that relatively high porosity was maintained with the addition of small amounts of yttrium oxide, see also. Yttrium oxide slightly coarsened the pore size distribution as measured by $d_{10}$, $d_{50}$, and $d_{90}$. FIG. 9 shows that even low levels of yttrium oxide resulted in a very significant increase in strength such that the strength of the article more than doubled with the addition of only 1.0 wt % yttrium oxide. Yttrium oxide also reduced the degree of microcracking, as indicated by a decrease in $Nb^3$ for the kaolin-based compositions, see FIG. 10. FIG. 11 shows that addition of yttrium oxide to the kaolin-based compositions resulted in increased strain tolerance, MOR/E, of the body at room temperature (@25° C.). Values of MOR/E≥0.125% were exhibited by exemplary embodiments of the invention, wherein MOR is the modulus of rupture strength of a cellular sample, and E is the elastic modulus at room temperature. Further examples exhibited increased strain tolerance, as exemplified by MOR/E≥0.150%, or even MOR/E≥0.175%.

Figure 12:
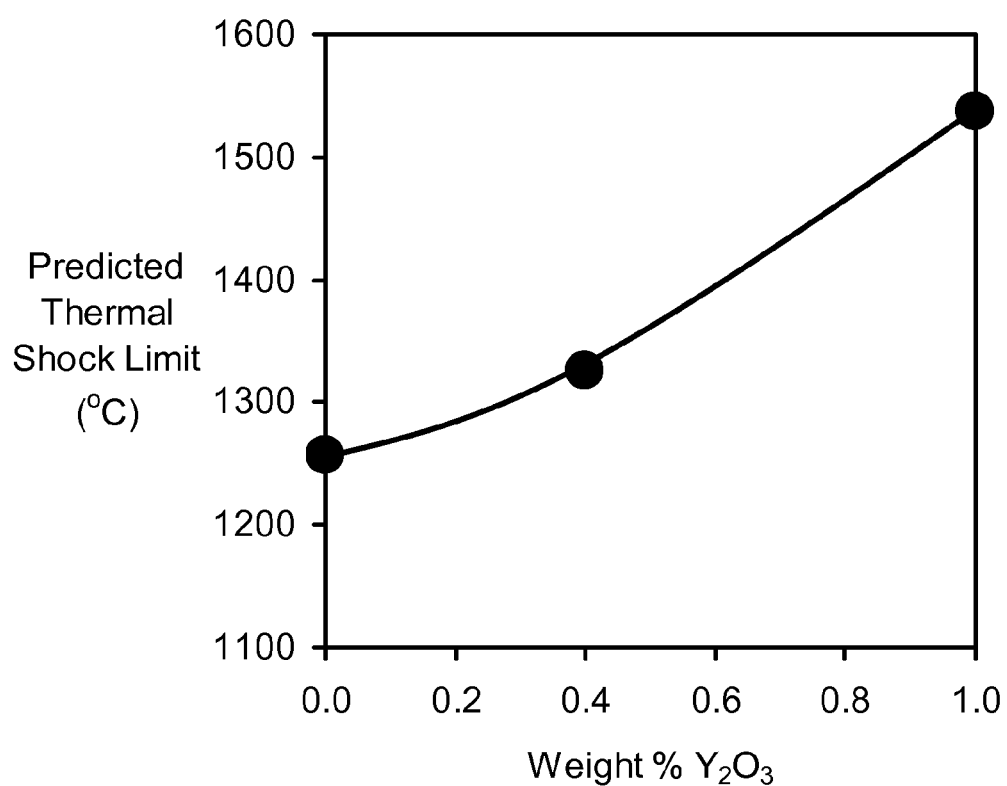
FIG. 12 is a graph of predicted thermal shock limit versus weight percent yttrium oxide for kaolin-based compositions.

The coefficient of thermal expansion increased slightly with yttrium oxide, but this increase was more than offset by the increase in strain tolerance (MOR/E), so that the predicted thermal shock limit (TSL) actually increased with increasing yttrium oxide addition, see FIG. 12 for kaolin-based examples. The TSL is defined as:

$$TSL\ (°C.) = 500°C. + TSP$$

wherein $$TSP\ (°C.) = MOR/[(E)(CTE_{500-900})]$$

in which MOR is the modulus of rupture measured at room temperature, E is the elastic modulus measured at room temperature, and $CTE_{500-900}$ is the mean coefficient of thermal expansion between 500° C. and 900° C. on heating. The predicted thermal shock limit (TSL) is a relative indication of the maximum temperature that an article can withstand within its central interior, without fracturing, when the surface temperature of the article is at about 500° C. Also provided for some examples is the thermal shock parameter $TSP^* = MOR/[(E)(CTE_{200-1000°\,C.})]$ and $TSL^* = TSP^* + 200$ When compared to typical relatively high-porosity cordierite honeycomb articles, honeycomb articles that included yttrium oxide possessed improved strength, as measured by modulus of rupture (MOR), reduced microcracking, increased strain tolerance (MOR/E), and/or increased thermal shock parameter (TSP).

For example, embodiments of the invention exhibited MOR on a 288 cpsi/15.5 mil sample of MOR≥400 psi, MOR≥500 psi, or even MOR≥600 psi. Further embodiments of the invention exhibited MOR on a 300 cpsi/13 mil sample of MOR≥1000 psi, MOR≥1300 psi, or even MOR≥1500 psi. Furthermore, certain embodiments of the invention may exhibit MOR/CFA≥1000 psi, MOR/CFA≥2000 psi, MOR/CFA≥3000 psi, or even MOR/CFA≥4000 psi, where CFA is the closed frontal area fraction of the honeycomb (wall area in axial cross section, excluding plugs, divided by the total cross-sectional area of the ceramic honeycomb).

Table 1 below illustrates suitable batch materials used to manufacture the high porosity porous ceramic honeycomb articles according to the invention.

TABLE 1

| | Batch Materials | |
|---|---|---|
| Batch Material | Median Particle Diameter (Microtrac) (μm) | Talc XRD Morphology Index |
| Talc A | 5.5 | 0.88 |
| Talc B | 10 | 0.90 |
| Talc C | 22 | 0.94 |
| Talc D | 23 | 0.94 |
| Alumina A | 0.6 | — |
| Alumina B | 3.4 | — |
| Alumina C | 6.8 | — |
| Alumina E | 9 | — |
| Al(OH)$_3$ | 4.6 | — |
| Boehmite | 0.12 | — |
| Kaolin A | 3 | — |
| Kaolin B | 10 | — |
| Quartz A | 4.5 | — |
| Quartz C | 25 | — |
| Attapulgite | 2.0 μm × 3 nm | — |
| Bentonite | −325 mesh | — |
| Graphite X | 5.8 | — |
| Graphite A | 9.5 | — |
| Graphite B | 35 | — |
| Graphite C | 125 | — |
| Rice Starch | 7.0 | — |
| Corn starch | 15 | — |
| Potato Starch | 49 | — |

TABLE 2

| | Porous Ceramic Honeycomb Batch Examples | | | | | | | | | | |
|---|---|---|---|---|---|---|---|---|---|---|---|
| Example No. | C1 | C2, C3 | 1, 3 | 2 | 4 | 5 | 6 | 7 | 8 | 9 | 10 |
| Talc A | 0 | 0 | 0 | 0 | 0 | 42.38 | 42.38 | 0 | 0 | 0 | 0 |
| Talc B | 0 | 0 | 0 | 0 | 0 | 0 | 0 | 42.38 | 42.38 | 0 | 0 |
| Talc C | 0 | 38.52 | 38.52 | 38.52 | 38.52 | 0 | 0 | 0 | 0 | 42.38 | 42.38 |
| Talc D | 40.70 | 0 | 0 | 0 | 0 | 0 | 0 | 0 | 0 | 0 | 0 |
| Alumina B | 14.80 | 0 | 0 | 0 | 0 | 0 | 0 | 0 | 0 | 0 | 0 |
| Alumina C | 0 | 0 | 0 | 0 | 0 | 30.12 | 30.12 | 30.12 | 30.12 | 30.12 | 30.12 |
| Alumina E | 0 | 12.27 | 12.27 | 12.27 | 12.27 | 0 | 0 | 0 | 0 | 0 | 0 |
| Al(OH)$_3$ | 16.00 | 20.99 | 20.99 | 20.99 | 20.99 | 0 | 0 | 0 | 0 | 0 | 0 |
| Kaolin A | 16.00 | 0 | 0 | 0 | 0 | 0 | 0 | 0 | 0 | 0 | 0 |
| Kaolin B | 0 | 12.84 | 12.84 | 12.84 | 12.84 | 0 | 0 | 0 | 0 | 0 | 0 |
| Boehmite | 0 | 0 | 0 | 0 | 0 | 5.00 | 5.00 | 5.00 | 5.00 | 5.00 | 5.00 |
| Quartz A | 0 | 0 | 0 | 0 | 0 | 23.50 | 23.50 | 23.50 | 23.50 | 23.50 | 23.50 |
| Quartz C | 12.50 | 15.38 | 15.38 | 15.38 | 15.38 | 0 | 0 | 0 | 0 | 0 | 0 |
| Attapulgite | 0 | 0 | 0 | 0 | 0 | 5.00 | 5.00 | 5.00 | 5.00 | 5.00 | 5.00 |
| Y$_2$O$_3$ | 0 | 0 | 0.40 | 1.00 | 0 | 1.00 | 1.00 | 1.00 | 1.00 | 1.00 | 1.00 |
| La$_2$O$_3$ | 0 | 0 | 0 | 0 | 0.40 | 0 | 0 | 0 | 0 | 0 | 0 |
| Graphite B | 0 | 20.00 | 20.00 | 20.00 | 20.00 | 45.00 | 20.00 | 45.00 | 20.00 | 45.00 | 20.00 |
| Graphite C | 20.00 | 0 | 0 | 0 | 0 | 0 | 0 | 0 | 0 | 0 | 0 |
| Potato Starch | 0 | 20.00 | 20.00 | 20.00 | 20.00 | 0 | 0 | 0 | 0 | 0 | 0 |
| Corn Starch | 0 | 0 | 0 | 0 | 0 | 20.00 | 10.00 | 20.00 | 10.00 | 20.00 | 10.00 |

TABLE 3

Porous Ceramic Honeycomb Batch Examples

| Example Number | 11, 12 | 13 | 14 | 15 | 16 | 17 | 18 | 19 | 20 | 21 |
|---|---|---|---|---|---|---|---|---|---|---|
| Talc A | 42.24 | 42.24 | 42.24 | 42.24 | 42.24 | 42.24 | 42.38 | 42.38 | 42.38 | 42.38 |
| Alumina A | 0 | 0 | 29.35 | 0 | 29.35 | 29.35 | 0 | 0 | 0 | 0 |
| Alumina B | 0 | 29.35 | 0 | 0 | 0 | 0 | 0 | 0 | 0 | 0 |
| Alumina C | 29.35 | 0 | 0 | 29.35 | 0 | 0 | 30.12 | 30.12 | 30.12 | 30.12 |
| Boehmite | 6.00 | 6.00 | 6.00 | 6.00 | 6.00 | 6.00 | 5.00 | 5.00 | 5.00 | 5.00 |
| Quartz A | 22.41 | 22.41 | 22.41 | 22.41 | 22.41 | 22.41 | 23.50 | 23.50 | 23.50 | 23.50 |
| Attapulgite | 0 | 0 | 0 | 0 | 0 | 0 | 0 | 5.00 | 0 | 0 |
| Bentonite | 0 | 0 | 0 | 5.00 | 5.00 | 0 | 0 | 0 | 0 | 5.00 |
| $Y_2O_3$ | 1.00 | 1.00 | 1.00 | 1.00 | 1.00 | 1.00 | 1.00 | 1.00 | 2.00 | 1.00 |
| Graphite X | 0 | 0 | 0 | 45.00 | 45.00 | 0 | 0 | 0 | 0 | 0 |
| Graphite A | 45.00 | 45.00 | 45.00 | 0 | 0 | 35.00 | 0 | 0 | 0 | 0 |
| Graphite B | 0 | 0 | 0 | 0 | 0 | 0 | 45.00 | 45.00 | 45.00 | 45.00 |
| Rice Starch | 15.00 | 15.00 | 15.00 | 15.00 | 15.00 | 20.00 | 0 | 0 | 0 | 0 |
| Corn Starch | 0 | 0 | 0 | 0 | 0 | 0 | 15.00 | 15.00 | 15.00 | 15.00 |

As can be seen from the above examples, a batch of inorganic powdered materials comprising cordierite-forming sources (such as alumina-forming sources, magnesia-forming sources, and silica-forming sources) may be dry mixed with a suitable pore former and a temporary binder (such as methylcellulose material) to form a dry batch. A suitable liquid vehicle, such as water, together with a plasticizer or lubricant may be added and mulled to form a plasticized batch. The plasticized batch is then formed, such as by extrusion through a die, to form a green body honeycomb as described in U.S. Pat. No. 5,205,991. This green body is then dried, such as by microwave or RF drying, and fired in a suitable furnace to form the inventive ceramic honeycomb article. For example, the honeycomb articles of the invention may be fired at between 1400° C. and 1440° C. for 4 to 40 hours to form a ceramic body with a predominant phase of cordierite and including 0.1 to 5 wt. % of the rare earth oxide within the microstructure of the walls of the honeycomb article. The final body preferably includes at least 92% cordierite phase, for example. Properties of embodiments of the ceramic honeycomb articles, as well as exemplary firing cycles, are described below in Tables below.

TABLE 4

Porous Ceramic Honeycomb Property Examples

| Example Number | C1 | C2 | C3 | 1 | 2 | 3 | 4 |
|---|---|---|---|---|---|---|---|
| % $Y_2O_3$ | 0 | 0 | 0 | 0.4 | 1.0 | 0.4 | 0 |
| % $La_2O_3$ | 0 | 0 | 0 | 0 | 0 | 0 | 0.4 |
| 800-900 Rate (° C./h) | — | 37 | 27 | 37 | 37 | 27 | 37 |
| 1150-1200 Rate (° C./h) | — | 25 | 109 | 25 | 25 | 109 | 25 |
| 1200-1300 Rate (° C./h) | — | 25 | 109 | 25 | 25 | 109 | 25 |
| 1300-1340 Rate (° C./h) | — | 25 | 109 | 25 | 25 | 109 | 25 |
| 1350-1400 Rate (° C./h) | — | 5 | 109 | 5 | 5 | 109 | 5 |
| Maximum Temperature (° C.) | 1405 | 1409 | 1425 | 1409 | 1409 | 1425 | 1409 |
| Hold Time (h) | 11 | 11 | 20 | 11 | 11 | 20 | 11 |
| % Porosity | 50.0 | 66.3 | 63.9 | 66.1 | 64.7 | 63 | 66.1 |
| $d_{10}$ | 3.2 | 7.4 | 15.1 | 7 | 8.5 | 19.9 | 7.4 |
| $d_{50}$ | 12.7 | 16 | 24.4 | 17.7 | 18.7 | 29.7 | 15.5 |
| $d_{90}$ | 29.9 | 29.5 | 46.8 | 43 | 36.9 | 61.4 | 30.8 |
| $(d_{50} - d_{10})/d_{50} = d_f$ | 0.75 | 0.54 | 0.38 | 0.60 | 0.55 | 0.33 | 0.52 |
| $(d_{90} - d_{10})/d_{50} = d_b$ | 2.10 | 1.38 | 1.30 | 2.03 | 1.52 | 1.40 | 1.51 |
| MPCF = % Porosity/$d_b$ | 23.8 | 48 | 49 | 32 | 43 | 45 | 44 |
| CTE, 25-800 ($10^{-7}$/° C.) | 1.8 | 7.6 | 8.9 | 8.8 | 10.3 | 10.7 | 7.7 |
| CTE, 500-900 ($10^{-7}$/° C.) | 8.9 | 14.9 | 15.7 | 16.4 | 17.9 | 18.2 | 15.5 |
| $\Delta\alpha_{mc}$ 25-800° C. ($10^{-7}$/° C.) | 9.9 | 5.9 | — | 4.5 | 3.1 | — | — |
| Axial I-Ratio ($I_A$) | 0.39 | 0.42 | — | 0.42 | 0.42 | — | — |
| Transverse I-Ratio ($I_T$) | 0.87 | 0.80 | — | 0.80 | 0.79 | — | — |
| $\Delta I = I_T - I_A$ | 0.48 | 0.38 | — | 0.38 | 0.37 | — | — |
| % Mullite | 0 | 0.9 | — | 1.1 | 1.3 | — | — |
| % Spinel + Sapphirine | 2.4 | 2.9 | — | 2.5 | 2.4 | — | — |
| % Alumina | 0 | 0 | — | 0 | 0 | — | — |
| Cell Density (cells/inch$^2$) | 206 | 288 | 288 | 288 | 288 | 288 | 288 |
| Wall Thickness ($10^{-3}$ inches) | 12.2 | 15,5 | 15.5 | 15.5 | 15.5 | 15.5 | 15.5 |
| Closed Frontal Area (CFA) | 0.32 | 0.457 | 0.457 | 0.457 | 0.457 | 0.457 | 0.457 |
| MOR (psi) | 336 | 297 | 295 | 432 | 624 | 504 | 428 |
| MOR/CFA (psi) | 1051 | 650 | 646 | 945 | 1365 | 1103 | 937 |
| E at RT ($10^5$ psi) | 5.62 | 2.66 | 2.44 | 3.25 | 3.43 | 3.23 | 3.35 |
| E at 900° C. ($10^5$ psi) | 7.31 | 2.73 | 2.55 | 3.22 | 3.31 | 3.19 | 3.31 |
| E at 1000° C. ($10^5$ psi) | 8.39 | 2.80 | 2.64 | 3.25 | 3.30 | 3.31 | 3.33 |
| (E at 900° C.)/(E at RT) | 1.30 | 1.03 | 1.045 | 0.99 | 0.97 | 0.988 | 0.99 |
| (E at 1000° C.)/(E at RT) | 1.49 | 1.05 | 1.082 | 1.00 | 0.96 | 1.025 | 0.99 |

TABLE 4-continued

Porous Ceramic Honeycomb Property Examples

| Example Number | C1 | C2 | C3 | 1 | 2 | 3 | 4 |
|---|---|---|---|---|---|---|---|
| Microcrack Parameter, $Nb^3$ | 0.560 | 0.120 | 0.151 | 0.100 | 0.050 | 0.106 | 0.088 |
| MOR/E at RT | 0.060% | 0.112% | 0.121% | 0.133% | 0.182% | 0.156% | 0.128% |
| TSP = MOR/[E * CTE(500-900)] | 672 | 749 | 770 | 811 | 1016 | 857 | 824 |
| TSL = TSP + 500 | 1172 | 1249 | 1270 | 1311 | 1516 | 1357 | 1324 |

TABLE 5

Porous Ceramic Honeycomb Property Examples

| Example Number | 5 | 6 | 7 | 8 | 9 | 10 |
|---|---|---|---|---|---|---|
| % $Y_2O_3$ | 1.0 | 1.0 | 1.0 | 1.0 | 1.0 | 1.0 |
| 800-900 Rate (° C./h) | 75 | 75 | 75 | 75 | 75 | 75 |
| 1150-1200 Rate (° C./h) | 20 | 20 | 20 | 20 | 20 | 20 |
| 1200-1300 Rate (° C./h) | 10 | 10 | 10 | 10 | 10 | 10 |
| 1300-1340 Rate (° C./h) | 10 | 10 | 10 | 10 | 10 | 10 |
| 1350-1400 Rate (° C./h) | 10 | 10 | 10 | 10 | 10 | 10 |
| Maximum Temperature (° C.) | 1400 | 1400 | 1400 | 1400 | 1400 | 1400 |
| Hold Time (h) | 20 | 20 | 20 | 20 | 20 | 20 |
| % Porosity | 60.9 | 55.6 | 61.4 | 55.5 | 60.9 | 52.9 |
| $d_1$ | 6.4 | 4.1 | 5.6 | 2.9 | 5.1 | 3.2 |
| $d_2$ | 7.1 | 4.6 | 6.4 | 3.9 | 6 | 4.1 |
| $d_5$ | 8.1 | 5.5 | 7.8 | 5.1 | 7.6 | 5.2 |
| $d_{10}$ | 9.2 | 6.4 | 9 | 6.2 | 8.8 | 6.3 |
| $d_{50}$ | 12.2 | 9.7 | 12.4 | 9.3 | 13.3 | 9.7 |
| $d_{90}$ | 16.6 | 13.1 | 17.5 | 12.4 | 20.4 | 14.3 |
| $d_{95}$ | 26.2 | 21.2 | 31.4 | 17.9 | 38.9 | 21.9 |
| $d_{98}$ | 78.6 | 95.3 | 105.1 | 55.5 | 128.9 | 58 |
| $d_{99}$ | 145.2 | 179.6 | 180.6 | 125.3 | 206.4 | 109.2 |
| $(d_{50} - d_{10})/d_{50} = d_f$ | 0.25 | 0.33 | 0.28 | 0.34 | 0.34 | 0.35 |
| $(d_{90} - d_{10})/d_{50} = d_b$ | 0.61 | 0.69 | 0.69 | 0.66 | 0.87 | 0.82 |
| PCF = % Porosity/$d_b$ | 99 | 81 | 89 | 84 | 70 | 64 |
| CTE, 25-800 ($10^{-7}$/° C.) | 12.9 | 12.7 | 13.5 | 13.6 | 13.6 | 12.9 |
| CTE, 500-900 ($10^{-7}$/° C.) | 19.4 | 19.8 | 19.3 | 20.6 | 20.4 | 20.2 |
| CTE, 200-1000 ($10^{-7}$/° C.) | 16.8 | 17.1 | 17 | 18.2 | 17.8 | 17.4 |
| $\Delta\alpha_{mc}$ 25-800° C. ($10^{-7}$/° C.) | 1.8 | 1.0 | 0.7 | -0.8 | 0.7 | 0.5 |
| Axial I-Ratio ($I_A$) | 0.48 | 0.47 | 0.51 | 0.46 | 0.52 | 0.5 |
| Transverse I-Ratio ($I_T$) | 0.84 | 0.87 | 0.81 | 0.83 | 0.78 | 0.83 |
| $\Delta I = I_T - I_A$ | 0.36 | 0.4 | 0.3 | 0.37 | 0.26 | 0.33 |
| % Mullite | 0 | 0 | 0 | 0 | 0 | 0 |
| % Spinel + Sapphirine | 3.1 | 1.9 | 0.9 | 0.8 | 0.7 | 0 |
| % Alumina | 0 | 0 | 0 | 0 | 0 | 0 |
| Cell Density (cells/inch$^2$) | 300 | 300 | 300 | 300 | 300 | 300 |
| Wall Thickness ($10^{-3}$ inches) | 13 | 13 | 13 | 13 | 13 | 13 |
| Closed Frontal Area (CFA) | 0.4 | 0.4 | 0.4 | 0.4 | 0.4 | 0.4 |
| MOR (psi) | 1148 | 1818 | 996 | 1397 | 1035 | 1666 |
| MOR/CFA (psi) | 2872 | 4549 | 2492 | 3496 | 2590 | 4168 |
| E at RT ($10^5$ psi) | 5.2 | 9.81 | 5.46 | 9.17 | 5.74 | 11.4 |
| E at 900° C. ($10^5$ psi) | — | — | — | — | — | — |
| E at 1000° C. ($10^5$ psi) | — | — | — | — | — | — |
| (E at 900° C.)/(E at RT) | — | — | — | — | — | — |
| (E at 1000° C.)/(E at RT) | — | — | — | — | — | — |
| Microcrack Parameter, $Nb^3$ | — | — | — | — | — | — |
| MOR/E at RT | 0.221% | 0.185% | 0.182% | 0.152% | 0.180% | 0.146% |
| TSP = MOR/[E * CTE(500-900)] | 1138 | 936 | 945 | 740 | 884 | 723 |
| TSL = TSP + 500 | 1638 | 1436 | 1445 | 1240 | 1384 | 1223 |
| TSP* = MOR/[E * CTE(200-1000)] | 1314 | 1084 | 1073 | 837 | 1013 | 840 |
| TSL* = TSP* + 200 | 1514 | 1284 | 1273 | 1037 | 1213 | 1040 |

TABLE 6

Porous Ceramic Honeycomb Property Examples

| Example Number | 11 | 12 | 13 | 14 | 15 | 16 | 17 |
|---|---|---|---|---|---|---|---|
| % $Y_2O_3$ | 1.0 | 1.0 | 1.0 | 1.0 | 1.0 | 1.0 | 1.0 |
| 800-900 Rate (° C./h) | 75 | 75 | 75 | 75 | 75 | 75 | 75 |
| 1150-1200 Rate (° C./h) | 20 | 20 | 20 | 20 | 20 | 20 | 20 |
| 1200-1300 Rate (° C./h) | 10 | 10 | 10 | 10 | 10 | 10 | 10 |
| 1300-1340 Rate (° C./h) | 10 | 10 | 10 | 10 | 10 | 10 | 10 |
| 1350-1400 Rate (° C./h) | 10 | 10 | 10 | 10 | 10 | 10 | 10 |

TABLE 6-continued

Porous Ceramic Honeycomb Property Examples

| Example Number | 11 | 12 | 13 | 14 | 15 | 16 | 17 |
|---|---|---|---|---|---|---|---|
| Maximum Temperature (° C.) | 1380 | 1360 | 1380 | 1380 | 1380 | 1380 | 1380 |
| Hold Time (h) | 20 | 20 | 20 | 20 | 20 | 20 | 20 |
| % Porosity | 66.8 | 65.8 | 62.6 | 60.1 | 62.0 | 60.8 | 59.7 |
| $d_1$ | 2.8 | 3.6 | 1.7 | 1.5 | 3.4 | 1.5 | 1.2 |
| $d_2$ | 3.6 | 4.3 | 2.2 | 1.7 | 4.1 | 1.8 | 1.5 |
| $d_5$ | 4.9 | 5.4 | 2.9 | 2 | 5 | 2.1 | 1.9 |
| $d_{10}$ | 6 | 6.4 | 3.4 | 2.3 | 5.9 | 2.3 | 2.2 |
| $d_{25}$ | 8 | 7.9 | 4.2 | 2.7 | 7.7 | 2.6 | 2.6 |
| $d_{50}$ | 10 | 9.4 | 5.2 | 3.1 | 9.3 | 3.0 | 3.0 |
| $d_{75}$ | 12.6 | 11.9 | 6.5 | 3.5 | 11.3 | 3.6 | 3.5 |
| $d_{90}$ | 30.8 | 35.6 | 11.6 | 4.7 | 21.3 | 5 | 4.8 |
| $d_{95}$ | 98.4 | 117.4 | 44 | 8.6 | 56.7 | 8.5 | 8.7 |
| $d_{98}$ | 204.1 | 206.7 | 155.2 | 18.8 | 142.1 | 17.6 | 16.1 |
| $d_{99}$ | 260.6 | 253.9 | 210.6 | 38.4 | 202.4 | 33.2 | 27.8 |
| $(d_{50} - d_{10})/d_{50} = d_f$ | 0.40 | 0.32 | 0.35 | 0.26 | 0.37 | 0.23 | 0.27 |
| $(d_{90} - d_{10})/d_{50} = d_b$ | 2.48 | 3.11 | 1.58 | 0.77 | 1.66 | 0.90 | 0.87 |
| PCF = % Porosity/$d_b$ | 27 | 21 | 40 | 78 | 37 | 68 | 69 |
| CTE, 25-800 ($10^{-7}$/° C.) | 13 | 12.5 | 13.2 | 12 | 13.2 | 12.5 | 10.8 |
| CTE, 500-900 ($10^{-7}$/° C.) | 19.8 | 19.4 | 19.4 | 19.2 | 19.9 | 19.5 | 17.9 |
| CTE, 200-1000 ($10^{-7}$/° C.) | 17 | 16.7 | 17.1 | 16.7 | 17.5 | 17 | 15.4 |
| $\Delta\alpha_{mc}$ 25-800° C. ($10^{-7}$/° C.) | 1.1 | 2.4 | 0.6 | 1.3 | 0.2 | 0.1 | 1.0 |
| Axial I-Ratio ($I_A$) | 0.48 | 0.52 | 0.48 | 0.46 | 0.47 | 0.44 | 0.41 |
| Transverse I-Ratio ($I_T$) | 0.82 | 0.8 | 0.82 | 0.83 | 0.82 | 0.85 | 0.87 |
| $\Delta I = I_T - I_A$ | 0.34 | 0.28 | 0.34 | 0.37 | 0.35 | 0.41 | 0.46 |
| % Mullite | 0.8 | 0 | 0 | 0 | 0.6 | 0.9 | 0 |
| % Spinel + Sapphirine | 1.6 | 1.7 | 1.6 | 1.7 | 0.7 | 0.5 | 1.6 |
| % Alumina | 0 | 0 | 0 | 0 | 0 | 0 | 0 |
| Cell Density (cells/inch$^2$) | 600 | 600 | 600 | 600 | 600 | 600 | 600 |
| Wall Thickness ($10^{-3}$ inches) | 4 | 4 | 4 | 4 | 4 | 4 | 4 |
| Closed Frontal Area (CFA) | 0.186 | 0.186 | 0.186 | 0.186 | 0.186 | 0.186 | 0.186 |
| MOR (psi) | 197 | 145 | 297 | 409 | 431 | 442 | 330 |
| MOR/CFA (psi) | 1059 | 780 | 1597 | 2199 | 2320 | 2376 | 1774 |
| E at RT ($10^5$ psi) | 1.12 | 0.935 | 1.81 | 2.79 | 2.25 | 3.02 | 2.60 |
| E at 900° C. ($10^5$ psi) | 1.04 | 0.892 | 1.68 | 2.64 | — | — | — |
| E at 1000° C. ($10^5$ psi) | 0.948 | 0.812 | 1.54 | 2.42 | — | — | — |
| (E at 900° C.)/(E at RT) | 0.93 | 0.95 | 0.93 | 0.95 | — | — | — |
| (E at 1000° C.)/(E at RT) | 0.85 | 0.87 | 0.85 | 0.87 | — | — | — |
| Microcrack Parameter, $Nb^3$ | 0.008 | 0.015 | 0.014 | 0.017 | — | — | — |
| MOR/E at RT | 0.176% | 0.156% | 0.164% | 0.147% | 0.192% | 0.146% | 0.127% |
| TSP = MOR/[E * CTE(500-900)] | 888 | 799 | 846 | 764 | 966 | 750 | 708 |
| TSL = TSP + 500 | 1388 | 1299 | 1346 | 1264 | 1466 | 1250 | 1208 |
| TSP* = MOR/[E * CTE(200-1000)] | 1035 | 929 | 960 | 878 | 1099 | 860 | 824 |
| TSL* = TSP* + 200 | 1235 | 1129 | 1160 | 1078 | 1299 | 1060 | 1024 |

TABLE 7

Porous Ceramic Honeycomb Batch Examples

| Example Number | 18 | 19 | 20 | 21 |
|---|---|---|---|---|
| % $Y_2O_3$ | 1.0 | 1.0 | 2.0 | 1.0 |
| 800-900 Rate (° C./h) | 75 | 75 | 75 | 75 |
| 1150-1200 Rate (° C./h) | 20 | 20 | 20 | 20 |
| 1200-1300 Rate (° C./h) | 10 | 10 | 10 | 10 |
| 1300-1340 Rate (° C./h) | 10 | 10 | 10 | 10 |
| 1350-1400 Rate (° C./h) | 10 | 10 | 10 | 10 |
| Maximum Temperature (° C.) | 1400 | 1400 | 1400 | 1400 |
| Hold Time (h) | 20 | 20 | 20 | 20 |
| % Porosity | 65.0 | 60.7 | 58.3 | 59.5 |
| $d_1$ | 3.9 | 4.8 | 6.2 | 4.6 |
| $d_2$ | 4.7 | 5.9 | 6.9 | 5.3 |
| $d_5$ | 6.1 | 7.2 | 8.1 | 6.6 |
| $d_{10}$ | 7.5 | 8.3 | 9.2 | 7.7 |
| $d_{25}$ | 9.5 | 10.1 | 10.8 | 9.3 |
| $d_{50}$ | 11.3 | 11.7 | 12.3 | 10.9 |
| $d_{75}$ | 12.7 | 12.9 | 13.8 | 12.4 |
| $d_{90}$ | 15.5 | 16.5 | 17.9 | 16.4 |
| $d_{95}$ | 25.6 | 29.9 | 34.4 | 38.0 |
| $d_{98}$ | 109.0 | 106.1 | 113.6 | 144.1 |
| $d_{99}$ | 191.2 | 180.2 | 176.8 | 214.1 |
| $(d_{50} - d_{10})/d_{50} = d_f$ | 0.34 | 0.29 | 0.25 | 0.30 |
| $(d_{90} - d_{10})/d_{50} = d_b$ | 0.71 | 0.70 | 0.72 | 0.80 |
| PCF = % Porosity/$d_b$ | 92 | 87 | 82 | 74 |
| CTE, 25-800 ($10^{-7}$/° C.) | 12.2 | 12.7 | 11.3 | 12.7 |
| CTE, 500-900 ($10^{-7}$/° C.) | 19.4 | 19.4 | 18.1 | 19.0 |
| CTE, 200-1000 ($10^{-7}$/° C.) | 16.7 | 16.7 | 15.8 | 16.5 |
| $\Delta\alpha_{mc}$ 25-800° C. ($10^{-7}$/° C.) | 2.7 | 1.5 | 3.4 | 2.5 |
| Axial I-Ratio ($I_A$) | 0.51 | 0.51 | 0.5 | 0.52 |
| Transverse I-Ratio ($I_T$) | 0.82 | 0.82 | 0.82 | 0.79 |
| $\Delta I = I_T - I_A$ | 0.31 | 0.31 | 0.32 | 0.27 |
| % Mullite | 0.8 | 0 | 1.3 | 2.1 |
| % Spinel + Sapphirine | 1.3 | 0.9 | 0.9 | 0 |
| % Alumina | 0 | 0 | 0 | 0 |
| Cell Density (cells/inch$^2$) | 300 | 300 | 300 | 300 |
| Wall Thickness ($10^{-3}$ inches) | 14 | 14 | 14 | 14 |
| Closed Frontal Area (CFA) | 0.426 | 0.426 | 0.426 | 0.426 |
| MOR (psi) | 813 | 1123 | 475 | 1371 |
| MOR/CFA (psi) | 1908 | 2636 | 1115 | 3218 |
| E at RT ($10^5$ psi) | 4.30 | 6.91 | 4.26 | 8.86 |
| E at 900° C. ($10^5$ psi) | 4.04 | 6.19 | — | 8.08 |
| E at 1000° C. ($10^5$ psi) | 3.70 | 5.63 | — | 7.46 |
| (E at 900° C.)/(E at RT) | 0.940 | 0.896 | — | 0.912 |
| (E at 1000° C.)/(E at RT) | 0.860 | 0.815 | — | 0.842 |
| Microcrack Parameter, $Nb^3$ | 0.019 | 0.012 | — | 0.015 |
| MOR/E at RT | 0.189% | 0.163% | 0.112% | 0.155% |
| TSP = MOR/[E * CTE(500-900)] | 975 | 840 | 615 | 817 |

TABLE 7-continued

Porous Ceramic Honeycomb Batch Examples

| Example Number | 18 | 19 | 20 | 21 |
|---|---|---|---|---|
| TSL = TSP + 500 | 1475 | 1340 | 1115 | 1317 |
| TSP* = MOR/E * CTE(200-1000)] | 1132 | 975 | 707 | 939 |
| TSL* = TSP* + 200 | 1332 | 1175 | 907 | 1139 |

As can be seen from the above examples, embodiments of the invention may exhibit a pore connectivity factor (PCF) of the honeycomb article wherein PCF≥50% and PCF is defined as:

$$PCF = \% P/d_b$$

wherein $d_b = (d_{90} - d_{10})/d_{50}$.

Other exemplary embodiments may exhibit PCF≥60%, PCF≥70%, PCF≥80%, or even PCF≥90%. Filters exhibiting relatively higher PCF generally exhibit relatively low through-the-wall back pressure combined with relatively high strength and high MOR/E, therefore high TSP.

As can further be appreciated from the examples, honeycomb articles having relatively high porosity (% P≥55%), relatively high cells/per square inch (≥400 cpsi) and relatively thin walls ($t_{wall}$≤6 mils) may be manufactured which exhibit relatively high thermal shock resistance (TSP≥700 psi).

Numerous modifications and variations of the present invention are possible. It is, therefore, to be understood that within the scope of the following claims, the invention may be practiced otherwise than as specifically described. While this invention has been described with respect to certain preferred embodiments, different variations, modifications, and additions to the invention will become evident to persons of ordinary skill in the art. All such modifications, variations, and additions are intended to be encompassed within the scope of this patent, which is limited only by the claims appended hereto.

What is claimed is:

1. A ceramic honeycomb article, comprising:
    a predominant cordierite ceramic phase and at least about 0.1 wt. % of a rare earth oxide containing within the microstructure of the ceramic;
    a total porosity (% P) wherein % P≥45%;
    $E_{Ratio\ 1000}$≤1.05, wherein $E_{Ratio\ 1000} = E_{1000°\ C.}/E_{RT}$; and $CTE \le 15 \times 10^{-7}/°$ C. from 25° C.-800° C.; and
    $\Delta\alpha_{mc}$ less than 2.5,
    wherein at least a portion of the rare earth oxide is contained in an intercrystalline glass phase.

2. The ceramic honeycomb article of claim 1, further comprising: % P≥50%.

3. The ceramic honeycomb article of claim 1, further comprising: % P≥55%.

4. The ceramic honeycomb article of claim 1, further comprising: % P≥60%.

5. The ceramic honeycomb article of claim 1, further comprising a median pore size between 1-40 microns.

6. The ceramic honeycomb article of claim 1, further comprising:
    $E_{Ratio\ 1000}$≤1.00.

7. The ceramic honeycomb article of claim 1, further comprising:
    $E_{Ratio\ 1000}$≤0.95.

8. The ceramic honeycomb article of claim 1, further comprising:
    $E_{Ratio\ 1000}$<0.90.

9. The ceramic honeycomb article of claim 1, further comprising:
    $E_{Ratio\ 1000}$≤0.85.

10. The ceramic honeycomb article of claim 1, further comprising: $\Delta\alpha_{mc}$ less than 1.0.

11. The ceramic honeycomb article of claim 1, further comprising: PCF≥50% wherein PCF is a pore connectivity factor of the honeycomb article and PCF=% P/$d_b$ wherein $d_b = (d_{90} - d_{10})/d_{50}$.

12. The ceramic honeycomb article of claim 11, further comprising: PCF≥70%.

13. The ceramic honeycomb article of claim 11, further comprising: PCF≥90%.

14. The ceramic honeycomb article of claim 1, further comprising: MOR/E≥0.125% wherein MOR is the modulus of rupture strength of a cellular sample, and E is an elastic modulus of a cellular sample at room temperature.

15. The ceramic honeycomb article of claim 14, further comprising: MOR/E≥0.150%.

16. The ceramic honeycomb article of claim 14, further comprising: MOR/E≥0.175%.

17. The ceramic honeycomb article of claim 1, further comprising: $CTE \le 13 \times 10^{-7}/°$ C. from 25° C.-800° C.

18. The ceramic honeycomb article of claim 1, further comprising: $CTE \le 10 \times 10^{-7}/°$ C. from 25° C.-800° C.

19. The ceramic honeycomb article of claim 1, further comprising: TSP≥600° C. wherein TSP=MOR/[(E)($CTE_{500-900}$)], MOR is a modulus of rupture of a cellular sample, E is a room temperature elastic modulus of a cellular sample, and $CTE_{500-900}$ is the coefficient of thermal expansion measured from 500° C.-900° C.

20. The ceramic honeycomb article of claim 19, further comprising: TSP≥700° C.

21. The ceramic honeycomb article of claim 19, further comprising: TSP≥800° C.

22. The ceramic honeycomb article of claim 19, further comprising: TSP≥900° C.

23. The ceramic honeycomb article of claim 19, further comprising: TSP≥1000° C.

24. The ceramic honeycomb article of claim 1, further comprising:
    % P≥55%,
    ≥400 cpsi,
    $t_{wall}$≤153 μm wherein $t_{wall}$ is a wall thickness of the honeycomb article, and
    $d_{50}$≤10 μm.

25. The ceramic honeycomb article of claim 24, further comprising:
    % P≥55%,
    ≥400 cpsi,
    $t_{wall}$≤153 μm, and
    $d_{50}$≤5 μm.

26. The ceramic honeycomb article of claim 1, further comprising:
    % P≥50%, and
    $d_{50}$≥7 μm.

27. The ceramic honeycomb article of claim 1, wherein the rare earth oxide is selected from a group consisting of yttrium oxide, lanthanum oxide, and combinations thereof.

28. The ceramic honeycomb article of claim 1, wherein the predominant cordierite ceramic phase comprises a compound having a formula $[A]_x[M]_y[T]_zO_{18}$, where A is selected from a group consisting of alkali, alkaline earth, rare earth elements, $CO_2$, $H_2O$, and combinations thereof; M is selected from a group consisting of Mg, Fe, Mn, Co, and combinations thereof; T is selected from a group consisting of Al, Si, Ga, Ge, and combinations thereof; 0≤x≤1.0; 1.9≤y≤2.1; and 8.9≤z≤9.1.

29. The ceramic honeycomb article of claim 28, wherein 0≤x≤0.05; 1.98≤y≤2.02; and 8.98≤z≤9.02.

30. The ceramic honeycomb article of claim 28, wherein M consists essentially of Mg, and T is selected from a group consisting essentially of Al, Si, and combinations thereof.

31. The ceramic honeycomb article of claim 1, further comprising: 0.1 wt. % to 5.0 wt. % rare earth oxide.

32. The ceramic honeycomb article of claim 31, further comprising: 0.2 wt. % to 3.0 wt. % rare earth oxide.

33. The ceramic honeycomb article of claim 31, further comprising: 0.4 wt. % to 2.0 wt. % rare earth oxide.

34. A ceramic honeycomb article, comprising:
a total porosity (% P) wherein 50%≤% P≤70%,
a median pore size of 3-30 microns,
the article containing a cordierite-type phase including a compound having a formula $[A]_x[M]_y[T]_zO_{18}$, where A is selected from a group consisting of alkali elements, alkaline earth elements, rare earth elements, $CO_2$, $H_2O$, and combinations thereof; M is selected from a group consisting of Mg, Fe, Mn, Co, and combinations thereof; T is selected from a group consisting of Al, Si, Ga, Ge, and combinations thereof; 0≤x≤1.0; 1.9≤y≤2.1; and 8.9≤z≤9.1; and 0.1-5.0 wt. % of a rare earth oxide,
$E_{Ratio\ 1000} \leq 1.05$, wherein $E_{Ratio\ 1000} = E_{1000°\ C}/E_{RT}$;
$CTE \leq 15 \times 10^{-7}/°C$. from 25° C.-800° C.; and
$\Delta\alpha_{mc}$ less than 2.5,
wherein at least a portion of the rare earth oxide is contained in an intercrystalline glass phase.

35. The ceramic article of claim 34, further comprising:
a cordierite-type phase comprising $Mg_2Al_4Si_5O_{18}$, and
0.1-5.0 wt. % of a rare earth oxide selected from a group consisting of yttrium oxide, lanthanum oxide, and combinations thereof.

* * * * *